Figure 1:
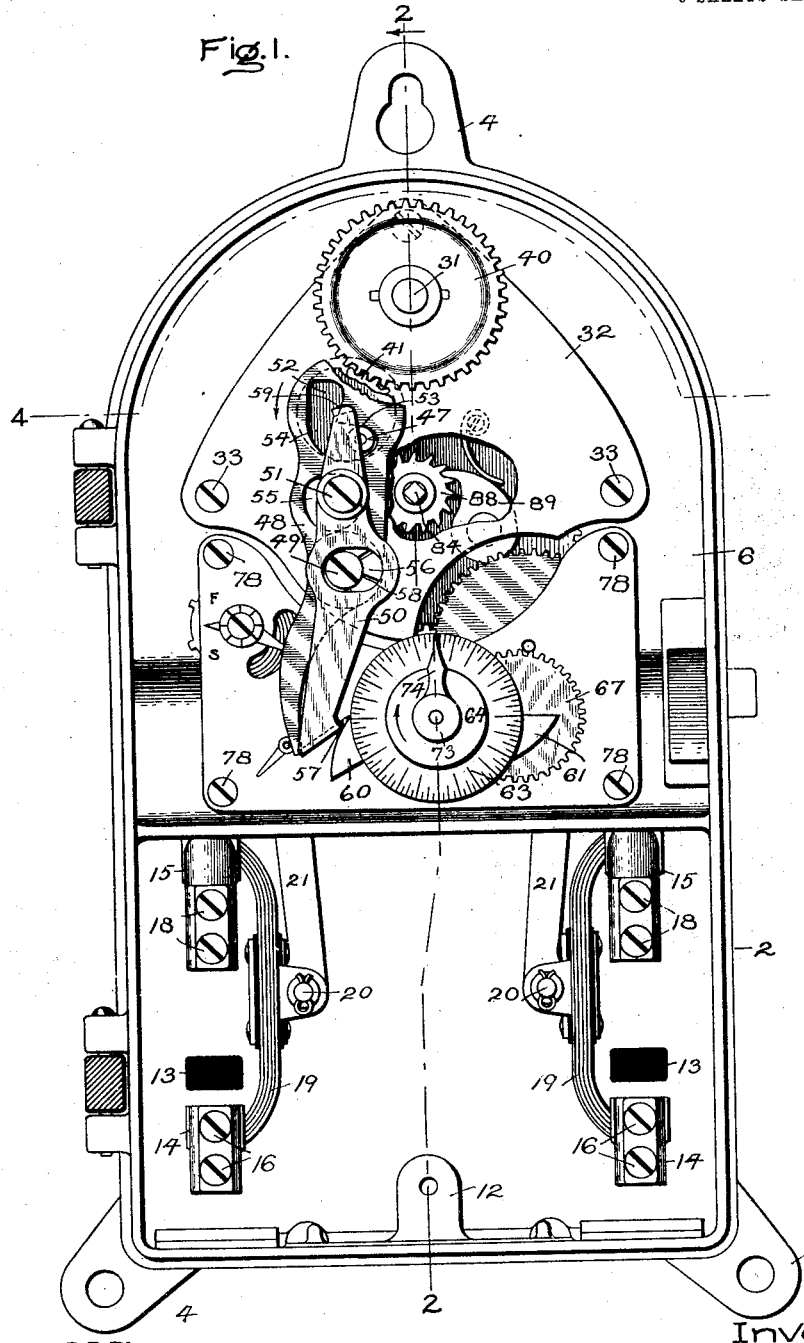

W. E. PORTER.
TIME SWITCH.
APPLICATION FILED MAY 14, 1907.

1,081,402.

Patented Dec. 16, 1913.

6 SHEETS—SHEET 1.

Witnesses:
W. Ray Taylor.
J. Ellis Glen

Inventor,
Willard E. Porter,
By Albert H. Davis
Att'y.

W. E. PORTER.
TIME SWITCH.
APPLICATION FILED MAY 14, 1907.

1,081,402.

Patented Dec. 16, 1913.
6 SHEETS—SHEET 4.

Witnesses:
W. Ray Taylor.
J. Ellis Glen

Inventor,
Willard E. Porter,
By Albert G. Davis
Att'y.

W. E. PORTER.
TIME SWITCH.
APPLICATION FILED MAY 14, 1907.
1,081,402.
Patented Dec. 16, 1913.
6 SHEETS—SHEET 5.
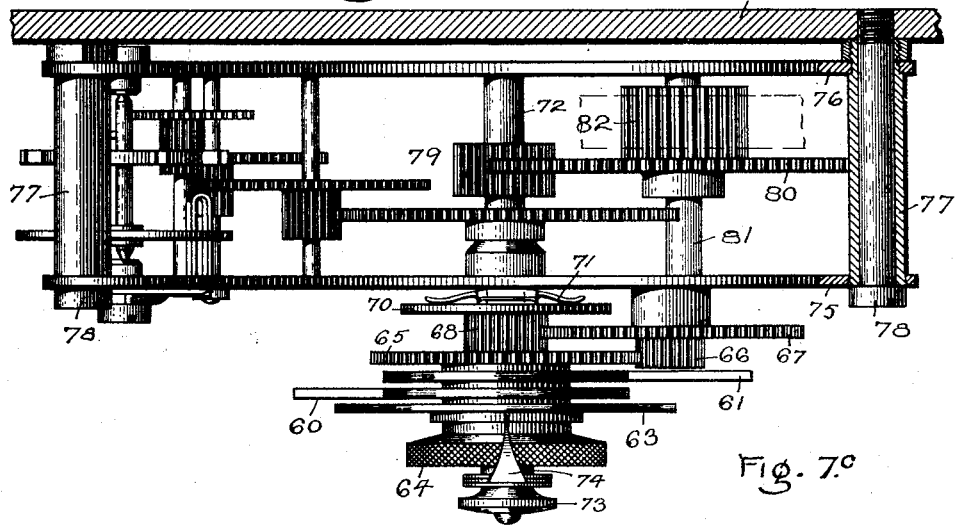
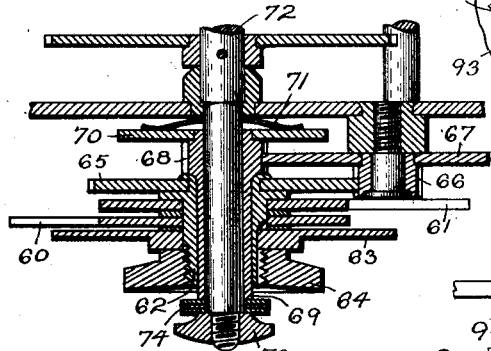
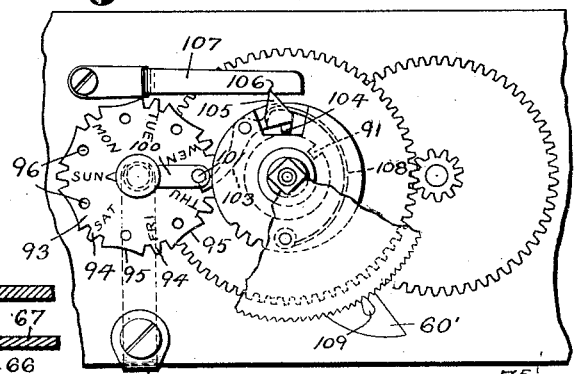
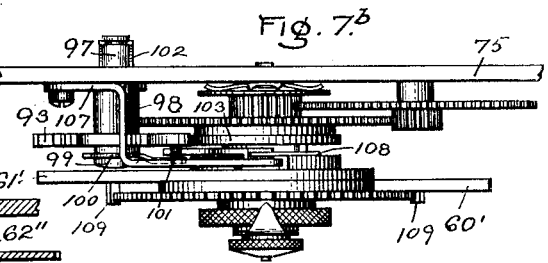
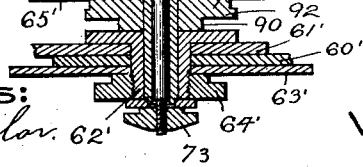
Witnesses:
W. Ray Taylor
J. Ellis Glen
Inventor,
Willard E. Porter,
By Albert G. Davis
Att'y.

W. E. PORTER.
TIME SWITCH.
APPLICATION FILED MAY 14, 1907.
1,081,402.  Patented Dec. 16, 1913.
6 SHEETS—SHEET 6.
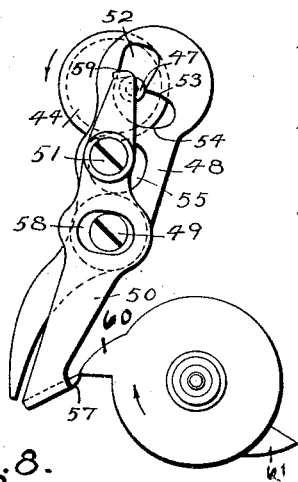
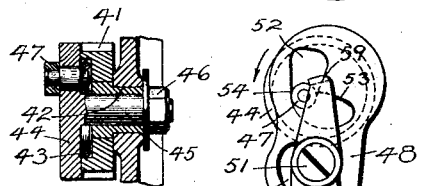
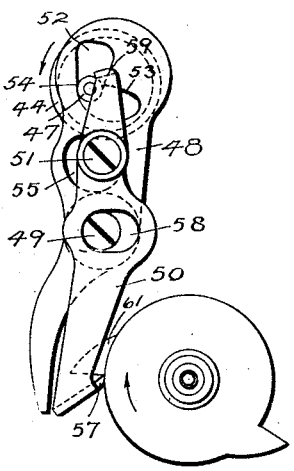
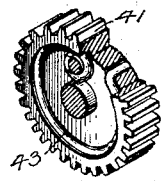
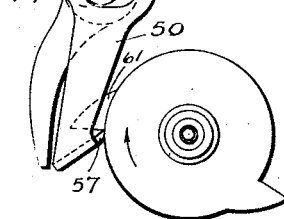
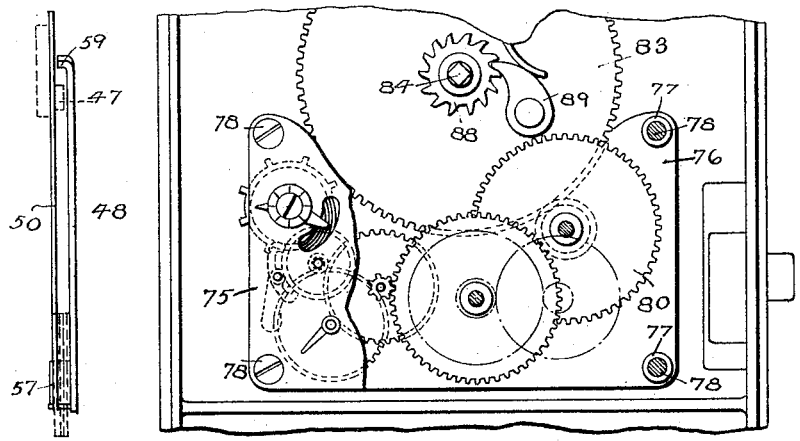
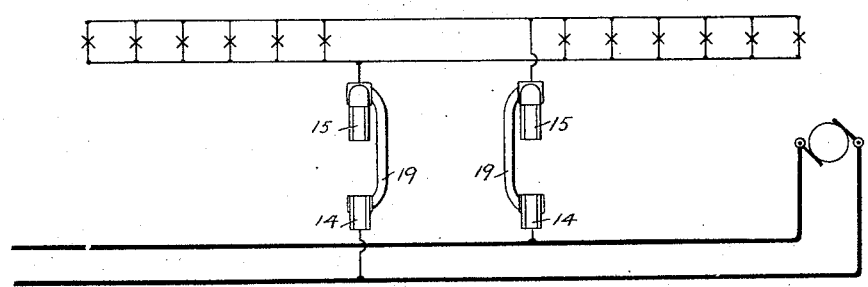
Witnesses:
W. Ray Taylor.
J. Ellis Glenn
Inventor,
Willard E. Porter,
By Albert G. Davis
Att'y.

UNITED STATES PATENT OFFICE.

WILLARD E. PORTER, OF LYNN, MASSACHUSETTS, ASSIGNOR TO GENERAL ELECTRIC COMPANY, A CORPORATION OF NEW YORK.

TIME-SWITCH.

1,081,402.  Specification of Letters Patent.  Patented Dec. 16, 1913.

Application filed May 14, 1907. Serial No. 373,605.

*To all whom it may concern:*

Be it known that I, WILLARD E. PORTER, a citizen of the United States, residing at Lynn, county of Essex, State of Massachusetts, have invented certain new and useful Improvements in Time-Switches, of which the following is a specification.

The present invention relates to electric switches and more particularly to time switches, or switches automatically controlled by a clock or other time mechanism for opening and closing at predetermined times the electric circuit of a translating device, such as electric lamps for illuminated signs, or for street lighting.

As time switches have been constructed heretofore, the gear trains for the time mechanism, the trip mechanism and the switch mechanism, have been so complex that the complete device has been objectionably large, or else the parts have been too delicate to operate satisfactorily under ordinary conditions of atmosphere and climate; moreover they have necessarily employed a plurality of springs to operate trains of gears and accordingly have required much time to wind up and keep in repair.

The object of my invention is to provide a time switch which shall be compact and highly efficient, easily and quickly adjusted and rewound, and generally adapted for outdoor use.

One embodiment of my invention is shown in the drawings forming a part of this specification, in which—

Figure 2:
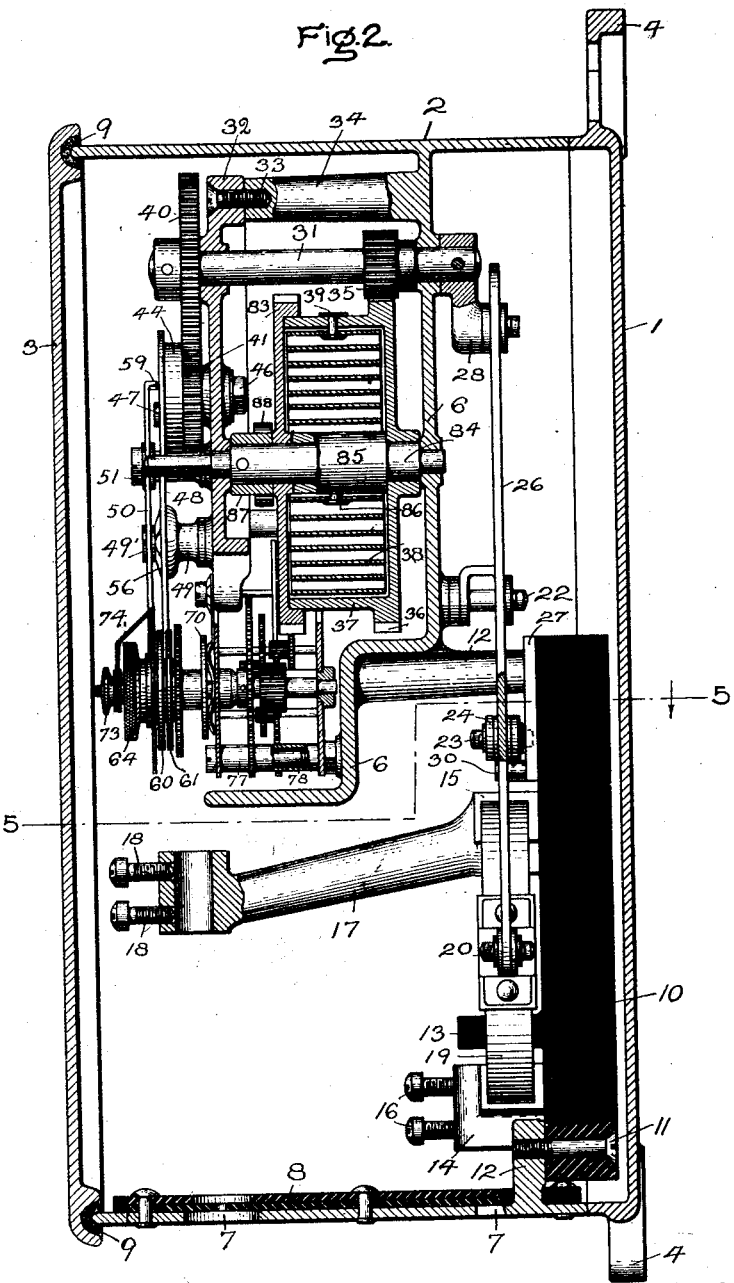
Figure 3:
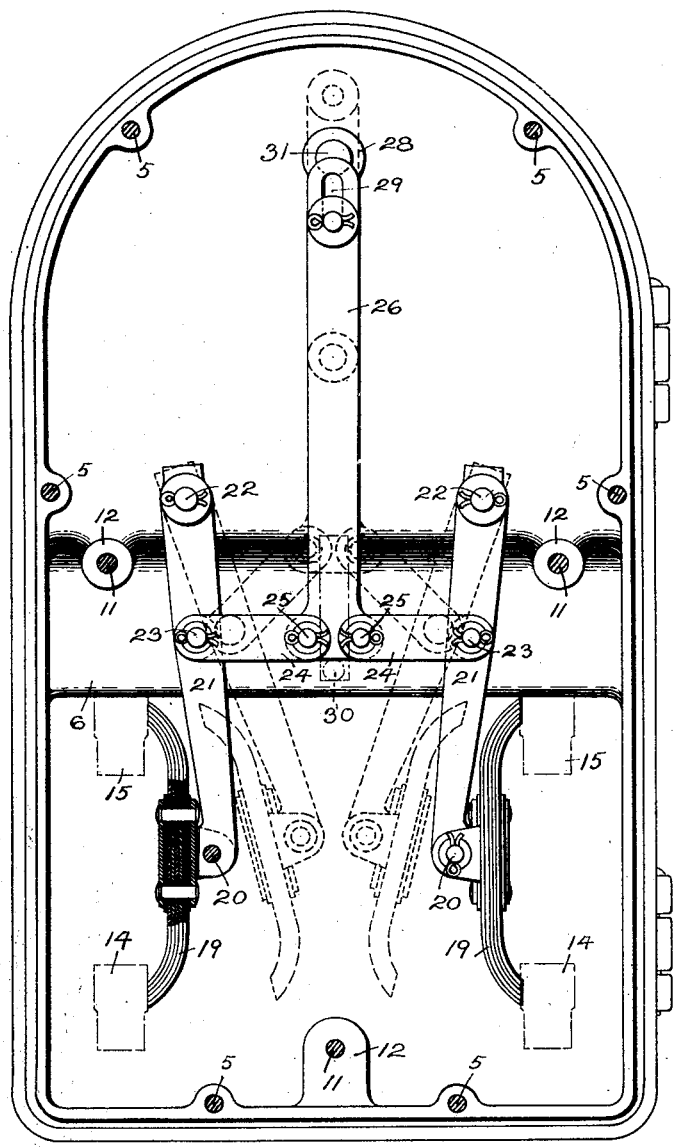
Figure 4:
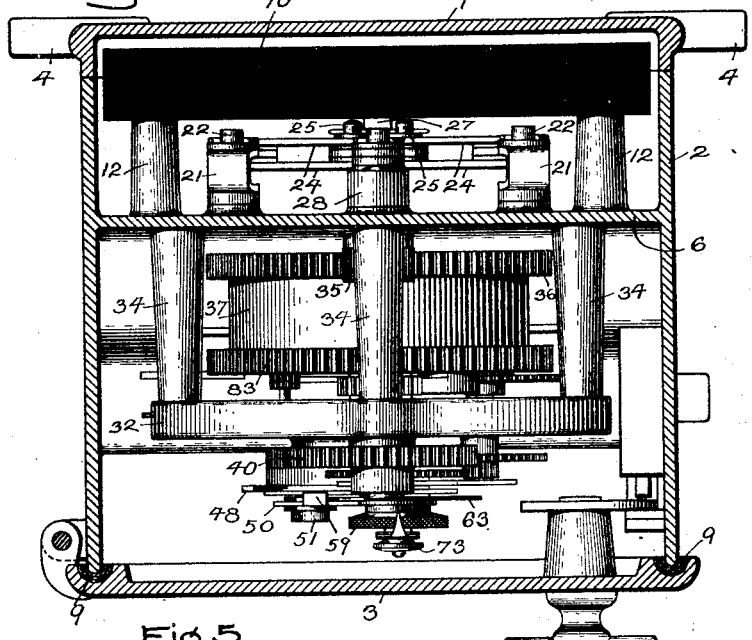
Figure 5:
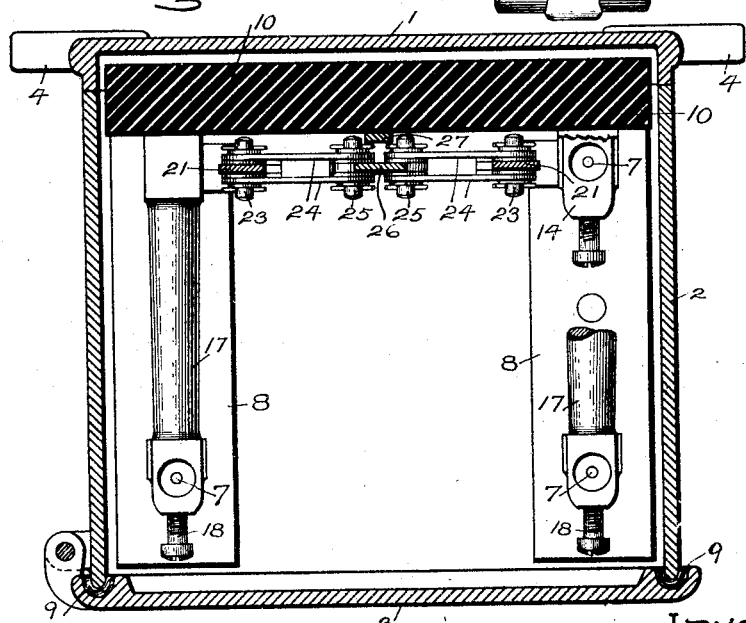

Figure 1 is a front elevation of the complete time switch arranged in its box, the door to the latter being removed; Fig. 2 is a vertical transverse section taken on line 2—2 of Fig. 1; Fig. 3 is a rear elevation of the switch contacts and operating levers; Fig. 4 is a horizontal section of the box taken on line 4—4 of Fig. 1 and showing the time switch in plan view; Fig. 5 is a horizontal section of the box taken on line 5—5 of Fig. 2 and showing the switch contacts in plan view; Fig. 6 is a plan view of the time train and trip cams; Fig. 7 is an axial section of the trip cams and actuating staff; Fig. 7ª is a similar view showing a modified form of actuating staff; Fig. 7ᵇ is a plan view thereof; Fig. 7ᶜ is a front elevation of the staff and coöperating gears; Fig. 8 is an edge view of the escapement levers; Figs. 9 and 10 are front elevations of the escapement levers and cams in different positions; Fig. 11 is an axial section of the escapement gear and roller plate; Fig. 12 is a perspective view of the escapement gear with a part broken away; Fig. 13 is a front elevation of the time train; and Fig. 14 is a diagram of the circuit connections controlled by applicant's time switch.

The inclosing box or casing is built up of three sections 1, 2 and 3. The back section 1 is in the form of a plate with projecting attaching lugs 4. The main section 2 is secured to the back section by set screws 5 and is provided with a support or barrier 6 extending from side to side across the upper portion, and at the bottom end are apertures 7 for the introduction of the conductor wires and insulating plates 8 are secured to the inner surface (see Fig. 5). The front section 3 is a door hinged at one side to the main section and provided near its edge with a gasket 9 of rubber whereby the atmospheric moisture is excluded from the interior of the casing.

The support for the stationary switch contacts consists of a slab 10 of slate or other insulating material secured by set screws 11 to lugs 12 on the main section 2 and is provided with horizontal barriers 13. Two pairs of stationary contacts 14, 15 are secured to the slab in vertical alinement on opposite sides of the barriers 13. The lower contacts 14 are made short and provided with binding screws 16 and the upper contacts 15 have projecting posts 17 provided with binding screws 18.

The movable contacts 19 are made of laminated spring metal and each is arranged to bear upon the sides of a pair of stationary contacts 14, 15. Hinge pins 20 are connected through insulation to the centers of the contacts 19 and a supporting and actuating lever 21 is connected to each pin 20. The upper ends of the levers 21 are fulcrumed on pins 22 projecting from the rear surface of barrier 6, and at a point below the fulcrum, each lever is provided with a transverse pin 23 to which toggle links 24 are connected. The inner ends of the links 24 are pivoted to pins 25 carried at the lower end of a connecting rod 26 and, in order to prevent the system of toggles and levers 21 moving bodily sidewise, a vertical guide plate 27 is secured to the slab 10 in a position to engage the rear ends of the pins 25. (See Figs. 4 and 5). Referring to Fig. 3, it will be observed that when the rod 26 moves into the lower or full line position, the toggle joint operates to force the movable contacts 19 into engagement with the stationary contacts 14 and 15 to close the circuit, and when the rod 26 moves into elevated or dotted line position, the toggle joint operates to retract the movable contacts into the position indicated in dotted lines to open the circuit. The rod 26 is moved up and down by a crank 28, and in order that the mechanism by which the latter is actuated may not be retarded in starting, a certain lost motion between the crank and rod is provided by means of a slot 29 cut in the latter in which the crank pin may travel during a partial revolution and, in order to prevent the rod from falling so as to carry the links 24 beyond their centers, a stop post 30 is secured to the lower end of the guide plate 27 and projects into the path of the rod, as shown in Figs. 2 and 3. The crank 28 is fixed to a shaft 31 journaled in the barrier 6 and a face plate 32 secured by screws 33 to posts 34 integral therewith. The shaft 31 has a small gear 35 fixed thereon which meshes directly with gear teeth 36 cut in a barrel 37 carrying a powerful main spring 38 and to which the outer end is attached at 39, and accordingly whenever the spring is under tension a rotating torque is imposed upon the shaft 31.

The means for restraining the rotation of the shaft 31 consists of a gear 40 fixed to the outer end thereof and an escapement gear 41, of one-half the effective diameter of gear 40, journaled on a bushing 42 secured in the face plate and provided in its front face with a recess in which is located a spring 43 having one end secured thereto and the other connected to a catch plate 44 having a stub shaft 45 extending through the bushing 42 and provided with a retaining nut 46. The plate 44 carries a catch in the form of an eccentric roller 47 which normally engages the escapement levers which operate to prevent the rotation of the plate 44 and gear 41. The object of mounting the roller 47 on a part connected by a spring to the gear instead of mounting the roller directly on the gear is to cushion the hammer blow produced by the contact of the roller with the holding surface of the escapement levers. By making the gears 40 and 41 in the ratio of 2 to 1, a complete revolution of the latter effects a half revolution of the former so that the crank 28 will be actuated from extreme upper to lower or lower to upper position at each release of the gear 41, whereby the switch will be alternately opened and closed upon the successive releases of the gear 41.

The escapement levers comprise a holding lever 48 pivoted near its center to a post 49 and a controlling lever 50 pivoted near its upper end to a post 51 located between the post 49 and the gear 41. The holding lever 48 has an enlarged upper end in which a cam slot 52 is cut and so shaped as to form a stop shoulder 53 for engaging the roller 47 and preventing the rotation of the escapement gear 41, and a circular shoulder 54 whereby the lever is actuated by the eccentric movement of the roller into engaging position. The lower end of the lever 48 is tapered off into a finger for engagement with the controlling lever 50. The lever 48 has also an aperture 55 formed therein so as to clear the post 51 and, in order to prevent reflex action of the lever, a friction washer 56 is interposed between it and its retaining screw 49'. The controlling lever 50 has an inclined shoulder 57 offset from its lower end into the path of the holding lever 48, a central aperture 58 to clear the pivot screw 49', and at its upper end an inclined shoulder 59 offset into the path of the roller 47 and disposed just above the stop shoulder 53 on the other lever. In Fig. 1 the escapement levers 48 and 50 are shown in normal positions with the stop shoulder 53 of the holding lever in engagement with the escapement roller 47 and the lower shoulder 57 about to engage the trip cam. In Fig. 9 the levers are shown in the positions assumed at the time the trip cam is about to pass out of engagement therewith. The roller has passed off the stop shoulder 53 on the holding lever shortly before the trip cam reached the position indicated and rests against the upper shoulder 59 on the controlling lever. Fig. 10 shows the positions of the escapement levers just after the trip cam clears the shoulder 57. The controlling lever 50 has swung back to its normal position having been moved by the roller 47 in clearing the inclined upper shoulder 59, and holding lever 48 has swung back to nearly its normal position by the eccentric action of the roller 47 on the circular shoulder 54. The roller is shown in this figure as having made about three-quarters of its angular movement, but it does not stop, of course, until it reaches the stop shoulder 53.

By providing two escapement levers, one may be freely subjected to the wear and tear imposed by the heavy main spring 38, while the other lever is entirely exempt therefrom except for the slight pressure momentarily exerted thereon after the escapement roller has left the holding lever 48, and, as a consequence, the escapement device does not get out of order even with severest use. By means of this sensitive and yet hardy escapement device, it is entirely practical to drive the switch actuated cam directly from the main spring gear and also the escapement gear therefrom through a single intermediate gear 40.

The trip cams 60 and 61 consist of flat metal disks with projections having their front or leading edges made cam-shaped and the rear edges radial. These cams are mounted on a hollow staff 62, corresponding to the lower hand staff of an ordinary clock train, a dial plate 63 is splined to the staff 62 and a thumb nut 64 is threaded to the outer end of the staff and serves to clamp the cams in adjusted positions, as shown in Figs. 1, 2, 6 and 7. The staff 62 is driven by a 24 to 1 speed reducing gear system 65, 66, 67 and 68 from the hollow minute hand staff 69 which projects through staff 62 and is provided at its inner end with a plate 70 engaging a slip washer 71 carried by a spindle 72 extending through the minute hand staff 69 and provided at its outer end with a thumb nut 73 which clamps a pointer 74 to the outer end of the staff 69.

The time train which may be substantially like the ordinary clock train, is mounted in bearing plates 75, 76 connected at their corners by hollow posts 77 and secured to the barrier 6 by screws 78 passing through the hollow posts. The spindle 72, which forms one of the units in the gear train, is provided with a pinion 79 which is in mesh with a gear 80 on a shaft 81 carrying a pinion 82 directly driven from a power gear 83 mounted on the shaft 84 of the main spring 38 and constituting a cover to the barrel 37. The shaft 84 has a sleeve 85 fixed thereon and to which the inner end of the spring 38 is attached at 86, and a collar 87 fixed thereto outside of the gear 83. The collar 87 has a series of ratchet teeth 88 with which engages a pawl 89 pivoted to the power gear 83, thereby enabling the shaft 84 to be turned by a key in the usual manner to wind up the spring 38 and thereafter permit the spring to react upon the gear 83 to produce a right hand movement thereof and also a left hand torque upon the barrel 37, as stated above, to actuate the switch whenever the escapement device is tripped.

In order to disable the trip cams 60 and 61 on certain predetermined days of the week, I make the cam staff 62, as shown in Figs. 7ª, 7ᵇ and 7ᶜ, in two sections, the outer section 62′ being adapted to receive the cams 60′, 61′, the dial 63′ and the thumb nut 64′, and the inner section 62″ being provided with a gear 65′, a boss 90 having a notch 91, and a mutilated gear 92 for engaging a pin wheel 93. The pin wheel 93 is provided with seven gear segments 94 separated by concave spaces 95 adapted to rest against the mutilated portion of gear 92, and adjacent each space 95 is a pin hole 96. The wheel is mounted on a shaft 97 journaled in a bush 98 secured to plate 75 to one side of the cam staff 62. The front end of the shaft has a thumb piece 99 to which is connected a trip arm 100 carrying a pin 101 adapted to enter a hole 96, and the rear end of the shaft is engaged by a leaf spring 102 which operates to hold it in rearmost position and at the same time allow it to be drawn forward by hand to reset the pin 101. A latch 103 is pivoted to the rear end of the front staff section 62′ and is shaped at its rear end to engage the trip arm 100, and has at its inner forward end a catch lug 104 adapted to enter the notch 91 in the boss 90 of the rear staff section 62″, and at its outer forward end a shouldered projection 105 adapted to enter a notch 106 in an arm 107 secured to the front plate 75. The latch 103 is tensioned by a spring 108 connected to the front staff section 62′ and operating to force the forward end inward whereby the catch lug 104 is normally held in the notch 91 to clutch the staff sections 62′ and 62″ together. The trip cam staff 62 being timed to make one revolution in twenty-four hours, the pin wheel will be given a seventh revolution each day, so that by setting the trip arm 100 according to the day of the week it is desired that the switch shall remain inactive, the staff sections 62′ and 62″ will remain clutched together until the arm 100 is moved into the position indicated in Fig. 7ᶜ, and the rear end of the latch 103 engages therewith on the predetermined day and the forward end lifted against the tension of the spring 108 out of engagement with the notch 91 in the rear staff boss 90 and carried into engagement with notch 106 in the stationary arm 107 whereby further rotary movement of the latch and the front staff section 62′ to which it is attached are arrested until the pin wheel is given another partial rotation on the succeeding day to carry the trip arm 100 out of engagement with the latch and permit it to reënter the notch 91 and recouple the staff sections.

In order to lock the trip cams 60′, 61′ in adjusted positions, the dial 63′ is peripherally notched and the cams are provided with knife-edged projections 109 adapted to engage therewith, as shown in Figs. 7ᵇ and 7ᶜ.

I do not desire to restrict myself to the particular construction or arrangement of parts herein shown and described, since it is apparent that they may be changed and modified without departing from my invention.

What I claim as new and desire to secure by Letters Patent of the United States, is,—

1. The combination of a switch, a shaft for operating said switch, means for biasing said shaft, an escapement gear operatively connected to said shaft and provided with an eccentric projection, a lever having a cam slot provided with a holding shoulder adapted to arrest and absorb the impact of said projection, and an independent time controlled lever adapted to receive said projection from said holding shoulder and determine its release.

2. The combination of a switch, a shaft for operating said switch, means for biasing said shaft, an escapement gear operatively connected to said shaft and provided with a spring-tensioned crank plate, a lever having a holding shoulder and an opposed circular shoulder for engaging said crank, and an independent time controlled lever controlling the movement of said holding lever and adapted to receive the crank therefrom and determine its ultimate release.

3. The combination of a trip cam, a staff section on which said cam is mounted, a second staff section, clutch mechanism for connecting said staff sections, and means operated by the second staff section for periodically releasing said clutch.

4. In a time switch, the combination of an electric switch, a timing mechanism, a trip cam, a staff section on which said cam is mounted, a second staff section, a clutch mechanism for connecting said staff sections, means for operating said clutch, and means for arresting the movement of the first staff section.

5. In a time switch, the combination of an electric switch, a timing mechanism, a trip cam, a staff section on which said cam is mounted, a second staff section positively driven, means for clutching said staff sections together, means actuated by the second staff section for controlling the said clutching means, and means for preventing movement of the cam staff section while uncoupled.

6. In a time switch, the combination of an electric switch, a timing mechanism, a trip cam, a staff section therefor, a spring-pressed latch pivoted to said section, a second staff section having a recess adapted to be engaged by said latch, and an intermittent wheel driven by said second staff section and provided with adjustable means for tripping said latch.

In witness whereof, I have hereunto set my hand this eleventh day of May, 1907.

WILLARD E. PORTER.

Witnesses:
JOHN A. MCMANUS, Jr.,
PHILIP F. HARRINGTON.

---

Copies of this patent may be obtained for five cents each, by addressing the "Commissioner of Patents, Washington, D. C."